US005124732A

United States Patent [19]

Manzer et al.

[11] Patent Number: 5,124,732

[45] Date of Patent: Jun. 23, 1992

[54] ELECTROPHOTOGRAPHIC PRINTER MEANS WITH REGULATED ELECTROPHOTOGRAPHIC PROCESS

[75] Inventors: Hans Manzer, Seefeld; Rainer Koefferlein, Munich, both of Fed. Rep. of Germany

[73] Assignee: Siemens Aktiengesellschaft, Berlin and Munich, Fed. Rep. of Germany

[21] Appl. No.: 576,403

[22] PCT Filed: Mar. 3, 1989

[86] PCT No.: PCT/DE89/00132

§ 371 Date: Sep. 14, 1990

§ 102(e) Date: Sep. 14, 1990

[87] PCT Pub. No.: WO89/08283

PCT Pub. Date: Sep. 8, 1989

[30] Foreign Application Priority Data

Mar. 4, 1988 [DE] Fed. Rep. of Germany ....... 3807121

[51] Int. Cl.[5] ...................... G01D 15/06; G03G 21/00

[52] U.S. Cl. ..................................... 346/154; 355/208

[58] Field of Search ................. 346/154; 355/203-209

[56] References Cited

U.S. PATENT DOCUMENTS

| | | |
|---|---|---|
| 3,788,739 | 1/1974 | Coriale . |
| 4,277,162 | 7/1981 | Kasahara et al. . |
| 4,593,407 | 6/1986 | Konishi et al. . |
| 4,724,461 | 2/1988 | Rushing . |
| 4,780,731 | 10/1988 | Creutzmann et al. . |
| 4,785,331 | 11/1988 | Oka et al. . |
| 5,019,862 | 5/1991 | Nakamura et al. ................. 355/208 |
| 5,043,765 | 8/1991 | Nagashima .......................... 355/208 |

FOREIGN PATENT DOCUMENTS

| | | |
|---|---|---|
| 0112450A1 | 7/1984 | European Pat. Off. . |
| 56-161555 | 12/1981 | Japan . |
| 58-86562 | 5/1983 | Japan . |
| 58-87560 | 5/1983 | Japan . |
| 58-115453 | 7/1983 | Japan . |
| 58-221858 | 12/1983 | Japan . |
| 59-201067 | 11/1984 | Japan . |
| 60-45265 | 3/1985 | Japan . |
| 61-105578 | 5/1986 | Japan . |
| 2141050 | 12/1984 | United Kingdom . |

OTHER PUBLICATIONS

"TRANSFER CORONA" by T. F. Cecil et al, IBM Technical Disclosure Bulletin, vol. 18, No. 8, Jan. 1976, p. 2408.

*Primary Examiner*—George H. Miller, Jr.

*Attorney, Agent, or Firm*—Hill, Van Santen, Steadman & Simpson

[57] ABSTRACT

An electrophotographic printer means contains a process-controlled regulating arrangement for acquiring and regulating the critical operating parameters of the electrophotographic process. It comprises a first regulating stage for stabilizing the electrophotographic process on the photoconductor (12) by regulating the charging potential (18 the discharge illumination), (17) and by acquiring and monitoring the residual potential (SL). It further comprises a second regulating stage for assuring and optimizing the development of the charge image by regulating the toner delivery to the developing region () and the inking of the charge image, and comprises a third regulating stage for assuring and optimizing the transfer printing by acquiring the specific characteristic quantities of the recording medium and regulating the corona means (UK).

8 Claims, 5 Drawing Sheets

ELECTROPHOTOGRAPHIC PRINTER MEANS WITH REGULATED ELECTROPHOTOGRAPHIC PROCESS

BACKGROUND OF THE INVENTION

The invention is directed to an electrophotographic printer means wherein charge images are generated on a photoconductor in the framework of an electrophotographic process in a sequence of process steps that sequence successively or, respectively, overlap one another, the charge images being generated via a character generator being developed in developer station, and being transferred onto a recording medium in a transfer printing station.

There is a significant difference between the acceptance of the copier result of electrophotographic copier devices and the printing result of printing equipment working on the principle of electrophotography by the operator: whereas the copier result in copier devices is measured against the original of the copy and the operator generally also accepts poor copies, this is not the case in electrophotographic printing equipment.

Electrophotographic printer means are generally employed in conjunction with EDP systems and the possibility of influencing the print quality is low or, respectively, the operator expects that the printer will deliver an optimum printing result under all conditions. Demands made of quality of the electrophotographic process that differ in height between printers and copier devices derive therefrom.

In order to satisfy this high demand with respect to the print quality in printers, it is necessary to minimize the tolerances in the electrophotographic process.

The quality of the commodities such as toner and developer or, respectively, the manufacturing quality of the photoconductor also have a significant influence on the print quality. The printer manufacturer has less influence on the quality of these materials during operation of the printer means.

In copier devices, it is known to regulate the units participating in the electrophotographic process to prescribed standard values via regulating means.

For instance, patent abstracts of Japan, Vol. 10, No. 288 (p-502) (2344), Sep. 30, 1986, and JP-A-61 105 578 disclose that the charging means for a photoconductive drum be controlled such for a defined time span during an after the turn-on phase that the fluctuations of the generated surface potential due to the turn-on event are compensated.

Patent Abstracts of Japan, Vol. 7, No. 101 (P-194) (1246), Apr. 28, 1983, JP-A-58 25 677 also disclose that the value of resistance of the paper web be acquired before the transfer printing station with the assistance of a multi-stage comparison means and that the corona discharge of the transfer corona in the transfer printing station be controlled step-by-step dependent thereon.

Patent Abstracts of Japan, Vol. 7, No. 184 (P-216) (1329), Aug. 13, 1983 and JP-A-58 86 562 disclose a regulating method for an electrophotographic copier means. The toner density and the residual charge on the surface of a photoconductor are thereby sensed with the assistance of a generated toner image of a standard image. The values acquired and calculated in this way are compared to prescribed standard values and a developer circuit, an illumination circuit, a toner delivery circuit and a developer sequence are controlled dependent thereon via a microcomputer circuit. Among other things, a reflection-type density measuring means and surface charge sensor are employed as sensors.

A standard original is imaged on the photoconductor with the known arrangement and the developer station is regulated dependent on the values of the standard original. What this means is that standard values of the electrophotographic process averaged over the standard original are acquired and different originals are copied with reference to these standard values proceeding on the basis of these standard values.

This has the disadvantage that an adaptation to different originals is not possible. Poor originals are developed as poor originals; a regulation of the standard values themselves dependent on the copying result is not provided.

U.S. Pat. No. 3,788,739 also discloses an electrophotographic means wherein a section in the printing region on a photoconductive drum is exposed with maximum illumination intensity and is then sensed with the assistance of a charge detector. The measured potential is then compared to a prescribed value. An adaptation of the values of potential in the charging, in the exposure, and in the transfer printing corona then ensues via a control means dependent on the measured potential.

Although the operating parameters critical for the image generating are also identified in electrophotographic printer and copier devices as disclosed, for example, by Japanese References JP-A-58 11 5453 and JP-A-58 221858, every operating parameter, however, is then compared prescribed, fixed manipulated variable and the manipulated variable for the process of image generating is defined therefrom.

SUMMARY OF THE INVENTION

A goal of the invention is to offer an electrophotographic printer means that delivers an optimum print quality regardless of quality fluctuations of the commodities and regardless of changing operating conditions.

A further goal of the invention is to design an electrophotographic printer means such that the tolerances in the electrophotographic process can be significantly reduced in order to achieve a maximum print quality. The overall process should thereby automatically sequence insofar as possible.

In an electrophotographic printer means, this object is achieved by a private means having the following steps: a process-controlled, regulating arrangement for optimizing the various operating parameters of the electrophotographic process by stabilizing the individual process step with respect to their operating parameters, whereby the next process step is based on a sequencing, stabilized process step: regulating blocks allocated to the individual process steps and arranged following one another for automatic regulation of the individual process steps based on the operating parameters of the individual process step and of the preceding process steps; sensors for acquiring the operating parameters of the individual process steps and input means for specific characterizing quantities of the electrophotographic process; and means for generating test marks and/or test patterns of process-relevant structures on the photoconductors outside of the actual printing region via the character generator dependent on the operating condition of the printer means, the charge status of the test marks and/or test patterns of process-relevant structures after the exposure and their inking density after the development on the photoconductor being acquired via the sensors.

What is guaranteed to be a constant print quality even given variations of the process itself derives on the basis of the process-controlled, multi-stage control arrangement for optimizing the electrophotographic process dependent on the process results and the process course of the individual process steps. The electrophotographic process itself is first stabilized via closed, inner control circuits and the operating parameters of the printer means including the process parameters are then regulated in the direction of optimum print quality.

Variations in the operating condition and fluctuations of the commodities used can have no influence. This raises the print quality and the overall printer means becomes more reliable.

BRIEF DESCRIPTION OF THE DRAWINGS

Embodiments of the invention are shown in the drawings and shall be set forth in greater detail below by way of example. Shown are.

DESCRIPTION OF THE PREFERRED EMBODIMENT

Figure 1:
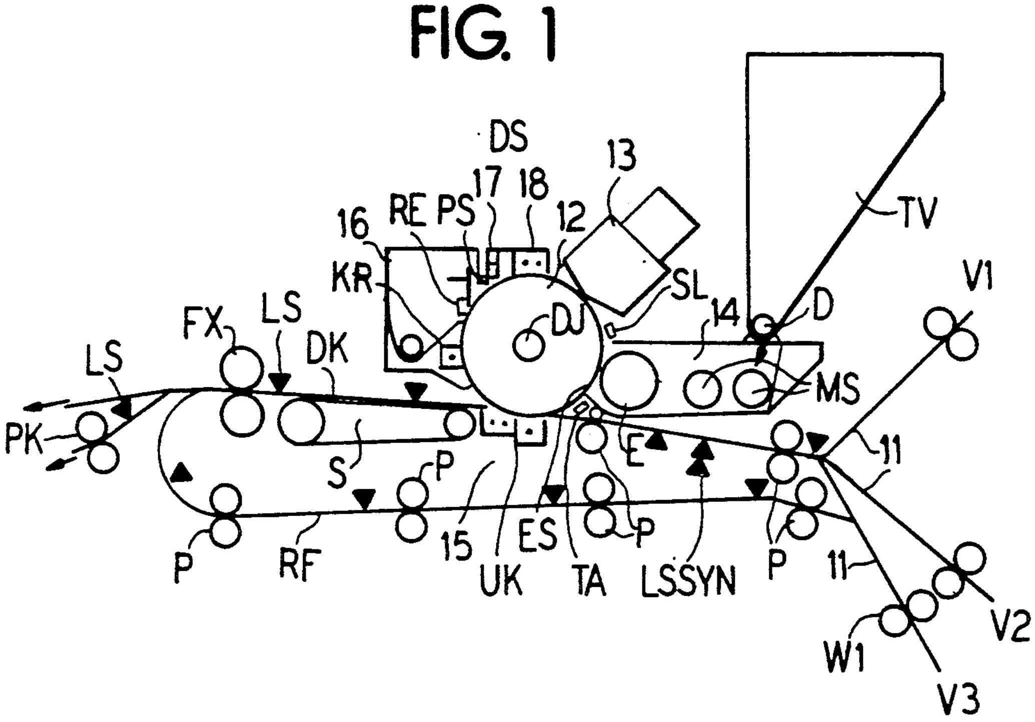
FIG. 1 a schematic, sectional view of an electrophotographic printer means for single sheets having duplex and simplex printing.

A single-sheet page printer schematically shown in FIG. 1 and working on the principle of electrophotography contains three paper supply bins V1, V2 and V3 having different capacities for the acceptance of single sheets. The paper supply bins V1, V2 and V3 are constructed in a standard way and are in communication with a print channel VK of the printer means via paper delivery channels 11. The print channel DK contains the actual printing station DS with a motor-driven photoconductive drum 12 around which the individual units of the electrophotographic printing station are arranged. One unit is a character generator 13 having a LED comb (not shown here) that can be driven character-dependent and has individually driveable luminous elements; this, for example, can be constructed corresponding to U.S. Pat. No. 4,780,731 (hereby incorporated by reference) and its light intensity can be controlled by varying the drive voltage or, respectively, the drive current. The character generator or illumination station 13 is followed by a charge sensor SL that measures the surface potential on the photoconductive drum and outputs a signal dependent thereon. The charge image produced on the photoconductor with the character generator 13 in character-dependent fashion is inked with the assistance of a developer station 14. The developer station 14 contains a toner reservoir TV for the acceptance of toner and contains a metering means D in the form of a metering drum. Dependent on the toner consumption, the metering drum D delivers toner to the actual developer station. The toner is blended with the assistance of two mixing screws MS and the developer mix composed of ferromagnetic carrier particles and toner particles is then delivered to a developer drum E. The developer drum E acts as what is referred to as a magnetic brush drum and is composed of a hollow drum having magnetic ledges arranged therein. The developer drum conveys the developer mix composed of ferromagnetic carrier particles and toner particles to the developing gap ES between photoconductive drum 12 and developer drum E. Excess developer is conveyed back into the developer station 14 via the developer drum E.

The developer station 14 is immediately followed by a toner mark sensor means TA in the form of a reflection sensor. This sensor means TA shall be described later and serves the purpose of sensing test marks produced and inked on the photoconductor upon call-in of a test routine or automatically and regularly and of evaluating these test patterns in view of, for example, inking density and color saturation.

The inked chart image is then transferred onto a recording medium, onto single sheets in this case, in a transfer printing station 15. To this end, the transfer printing station 15 comprises a transfer printing corona means UK. The transfer printing corona means UK loosens the inked charge image on the photoconductive drum so that it can be transferred onto the recording medium (single sheet).

The single sheet is then transported via a suction table S to a fixing station F having electrically heated fixing drums FX that are driven by an electric motor and the toner image situated on the recording medium is thermally fixed.

A cleaning station 16 follows in rotational direction of the photoconductive drum 12. The cleaning means 16 is constructed in a standard way and, for example, contains a stripper element RE that removes access toner or, respectively, the carrier particles from the photoconductive drum 12. This cleaning process is promoted by a corona means KR.

The surface of the photoconductive drum 12 is then discharged with the assistance of an illumination means 17. This illumination means contains a light source that is uniform over its entire spatial length and whose intensity can be designationally driven.

Subsequently, the surface of the photoconductive drum discharged by the discharge illumination is again uniformly charged in a charging means 18 having a charging corotron arranged therein.

For conveying the single sheets through the print channel, the print channel DK contains paper conveying elements in the form of a suction table S rotating band-shaped as well as in the form of paper conveyor drums P.

A return channel RF containing paper conveyor elements P in the form of motor-driven drum hairs is connected to the input side and output side of the print channel DK. The return channel RF comprises a turning means W1 in which the single sheets are turned over before being re-supplied to the print channel in DK in what is referred to as duplex mode wherein the front side and backside of the single sheets are printed.

The print channel DK is followed—driven via paper shunt—by a paper conveyor channel system DK that delivers the single sheets printed in the simplex or duplex method to deposit containers that are not shown here.

For identifying the position of the traversing single sheets and for controlling the paper conveyor elements P, all paper channels comprise paper sensing sensors LS (shown as black triangles) that are composed of light barriers. For reasons of surveyability, only a few light barriers are shown here.

Figure 2:
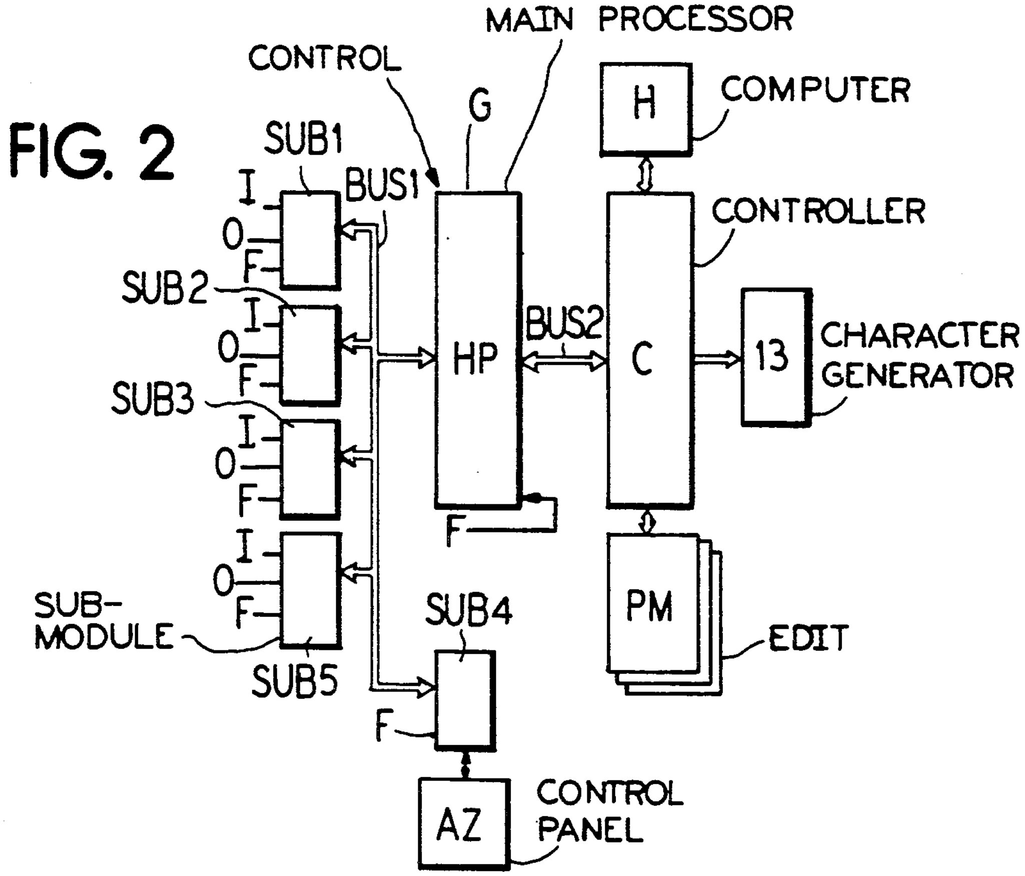
FIG. 2 a schematic block circuit diagram of a drive arrangement for the printer means.
Figure 3:
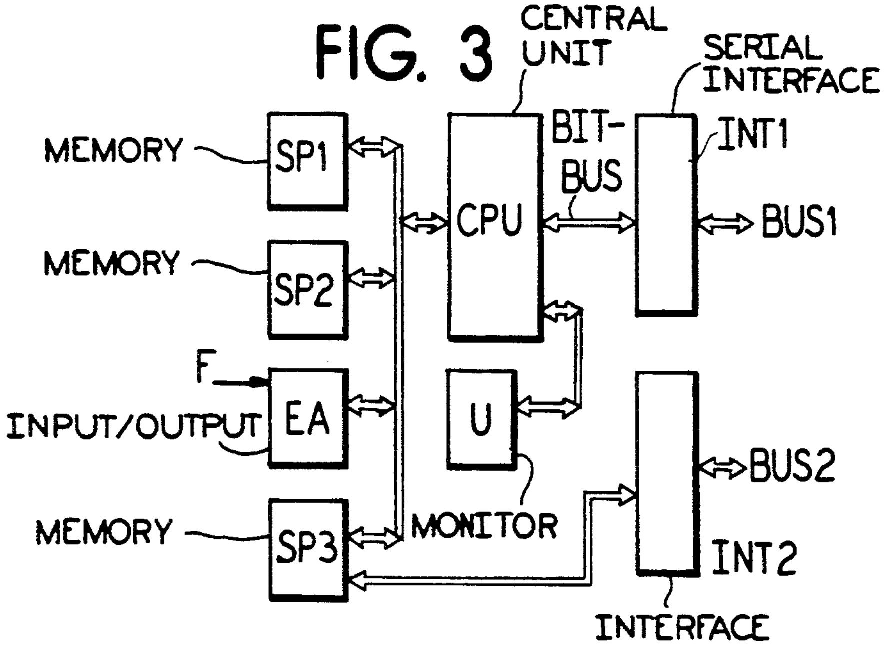
FIG. 3 a schematic block circuit diagram of the main processor employed in the drive arrangement of FIG. 2.

The page printer schematically shown in FIG. 1 is controlled with the assistance of a control arrangement as shown in FIGS. 2 and 3.

Control

The control for the page printer is fundamentally divided into a controller part C and into the actual device control G. The controller C is constructed basically in conformity with U.S. Pat. No. 4,593,407 (hereby incorporated by reference). It has the job of accepting the print data deriving from a computer H, of editing them page-by-page and of driving the character generator 13 of the printer station dependent on the characters to be portrayed. The device control G in turn serves for the coordinated execution of all printer functions. It is modularly constructed and is composed of a main processor HP and of various sub-modules SUB1 through SUB5 that guarantee an autonomous monitoring of the allocated printer units. The communication between the individual control parts ensues via a hard/software interfacing (network-shaped coupling serial bus) that is uniform for all parts. Every submodule SUB1 through SUB5 is equipped with its own processor and can independently operate the appertaining unit of the printer means and can itself be tested. This self-test capability means that independent test routines are implemented both when the apparatus is turned on as well as when requested by the main processor HP. All control modules of the printer in the device control are registered in a non-volatile memory with respect to their status. The controller can access these values. Moreover, the content of the non-volatile memory can be printed out insofar as necessary. There are also interfaces for auxiliary equipment.

FIGS. 2 and 3 show the fundamental structure of the device control in the form of a block circuit diagram. FIG. 3 thereby represents a block circuit diagram of the structure of the main processor HP.

All sub-modules SUB1 through SUB5 and the main processor HP are connected to one another with a serial interface INT1 that is driven via line drivers. The control of the serial interface INT1 ensues under the control of the main processor HP via a BIT-bus. The interface protocol thereby corresponds to the standard HDL/SDLC description (fast data transmission). In order to relieve the interface and to simplify the cable guidance to the individual units, the units are directly driven by the appertaining sub-modules SUB1 through SUB5 via power amplifiers that are not shown here. At periodic intervals, the main processor HP checks the function of individual sub-modules SUB1 through SUB5. A monitoring circuit (hardware/watchdog) checks the execution in the main processor. The synchronization of the executive sequencer with the circumferential speed of the photoconductive drum 12 ensues via the output signals of an angular momentum generator D1. The output of this angular momentum generator D1 (FIG. 1) is connected to all sub-modules SUB1 through SUB5 and supplies a synchronization signal F at cyclical intervals.

According to FIG. 3, the main processor comprises the following structure. A central unit CPU is in communication with three memories SP1 through SP3 and with an input-output unit EA. The memory SP1 involves a write-read memory, the memory SP2 involves an electrically programmable read-only memory and the memory SP3 involves a non-volatile data memory. Among other things, the input-output unit EA acquires the synchronization pulse F.

Consumption of commodities, printed/fixed page, maintenance intervals, error statistics as well as deviations from guidelines input by the operator, etc., are stored in the non-volatile memory SP3. The connection to the controller C ensues via a standard interface INT2.

The main processor HP has the job of coordinating all messages, instructions and measured data of the external stations SUB1 through SUB4 of checking these for possibility and of forwarding these. It also produces the connection to the controller C via the interface INT2 and the system BUS2. Bidirectional commands and messages are thereby forwarded. The proper program execution in the device control is continuously monitored via the monitoring circuit U (watchdog circuit).

As already set forth, five sub-modules SUB1 through SUB5 assume the autonomous monitoring and control of the units allocated to them. The communication between the individual modules SUB1 through SUB5 and the main processor HP ensues via a hard/software interface INT1 that is uniform for all parts. Every submodule has its own processor with input buffer that communicates the data supplied via the input I to the processor and has power stages that drive the appertaining units via the output O. The sub-modules are self-testable, i.e. independent test routines are implemented both when the device is switched on and when requested by the main processor HP.

The sub-module SUB1 monitors all sensors LS of the supply means V1 through V3, of the delivery channels 11 and of the print channel DK and, in particular, thereby monitors the start of print signal of the sensor LS SYN. The sub-module SUB1 controls all units in this region. It recognizes and reports paper motion errors.

The sub-module SUB4 controls a control panel AZ at the printer. The control panel AZ contains the keyboard and a display means, whereby the paper motion in the printer or, respectively, the place of malfunction given a paper malfunction are displayed via the display means.

The sub-module SUB4 in combination with the control panel AZ represents the interface between operator or, respectively, maintenance technician and the printer means. All inputs of the operator as well as all information from the device ensue via the control panel. This is essentially composed of a display for displaying the information as well as of a keyboard for inputting various instructions and parameters. Over and above this, it has some special operating and display elements available.

The sub-module SUB5 covers the sensors of the printer station DS and of the fixing station FX. For example, these sensors are the charge sensor SL for acquiring the surface potential of the photoconductor 12, transport monitoring sensors in the developer station 14, temperature sensors and micro-switches in the fixing station FX, the toner mark sensor TA between developer station 14 and transfer printing station UK. The sub-module SUB5 controls the units, the fixing lamps, motors, aerators, charge corotrons etc. The errors that occur are communicated to the main processor HP.

The sub-module SUB5 in combination with the main processor HB also contains the process-controlled regulating arrangement of the invention for acquiring and regulating the critical operating parameters of the electrophotographic process.

This regulating arrangement involves a process-controlled regulating arrangement that is constructed multi-stage and is fundamentally composed of three blocks (regulating units) CC1, CC2, CC3. In accord with the regulating strategy on which the regulation is based, the overall electrophotographic process is initially subdivided into a sequence of process steps that successively sequence or, respectively, overlap with one another, namely, the photoconductor process, the developing process and the transfer printing process. An attempt is then made to autonomously regulate the individual process steps via individual regulating blocks, namely, proceeding from the result of the individual process step and the course of the process in the process step. What is thereby the goal is to stabilize the individual process steps in view of their operating parameters in order to thus erect the next process step on the sequencing, stabilized process step.

This optimization of the overall electrophotographic process thus initially proceeds on the basis of the results of the individual steps. This, however, can only serve as the basis for a first approximation optimization because the three regulating blocks CC1, CC2, CC3 in turn form their own control system; for example, when a variation of the light intensity of the character generator 13 has a direct influence on the residual potential of the surface charge of the photoconductor 12, this in turn leads to a variation in contrast in the inking in the developer station. When, thus, the modification to be leveled is identified in the process step of "developing", it can be necessary to regulate parameters whose variations have influence on the process step of "photoconductor".

Figure 4:
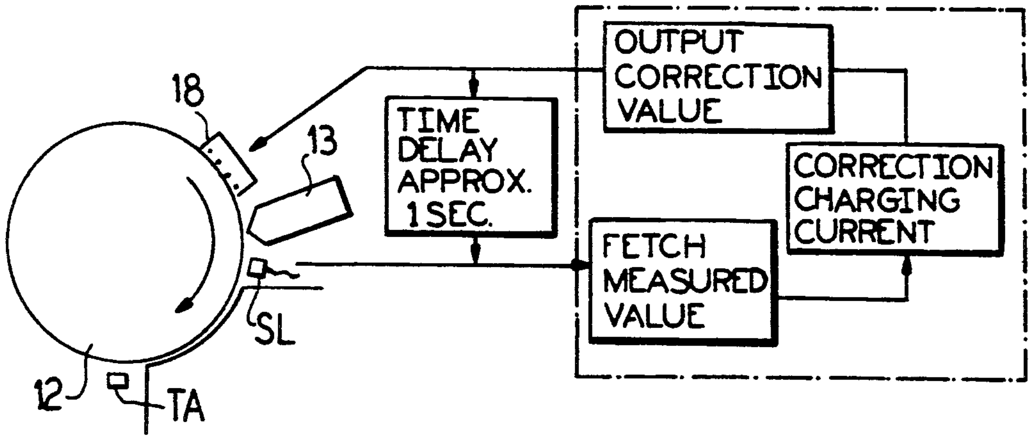
FIG. 4 a fundamental illustration of the control circuit for regulating the charging potential.

A stabilization of the electrophotographic parameters ensues in the first regulating stage CC1 as a pre-condition for an optimization of the developing process. What are thereby to be understood by the electrophotographic parameters are particularly the influencing variables on the charge management on the photoconductor. In order to be able to reliably regulate this charge management in the photoconductor, the first regulating stage contains a control circuit shown in FIG. 4 for regulating the charging potential on the photoconductor.

Test runs and experiences during operation have shown that it is especially the tolerances of the charging of the photoconductive drum that can have a highly quality-diminishing influence and can be the cause of malfunctions. In particular, the influencing variables are thereby scatters in drum units, temperature and atmospheric humidity, photoconductor fatigue, aging condition of the toner, influence of the cleaning station, device adjustment and corotron condition in the charging station 18. In order to become independent of these influencing quantities, it is necessary to regulate the charging potential of the photoconductor. To this end, a charge sensor SL in, for example, the form of an electric voltmeter with which the charging potential of the photoconductive drum can be constantly acquired is situated immediately in front of the developer station. The output signal of this measuring probe is interrogated at defined intervals via a standard interrogation arrangement AF. The interrogation arrangement AF compares the fetched measured values to stored guideline measured values and corrects the charging current at the charging corotron 18. The correction value that is output is again acquired by the measured value acquisition means AF after a time delay of about one second corresponding to the circumferential speed of the photoconductive drum 12. This cyclical acquisition enables a nearly delay-free correction of the charging current of the charging corotron 18. The regulation of the charging potential is thereby of extremely great importance for the print quality. Fluctuations in the charging potential have a direct influence on the print quality. The constant, automatic acquisition and correction of the charging potential enables a reliable operation within the allowable bandwidth. It is possible with the regulating arrangement of the invention to reduce the occurring tolerance of the charging potential by the factor 5, for example, from an absolute 400 volts to approximately 80 volts. The remaining 80 volts of potential tolerances particularly have their cause in the non-levelable charging fluctuations at the circumference of the photoconductive drum. An obtainable reduction in tolerance from 400 volts to 80 volts, however, already leads to a considerable stabilization of quality and reliability. For example, it is thus possible to boost the bias at the developer station for better large-area inking and to simultaneously guarantee adequate protection against background inking.

In a further control circuit allocated to the first regulating stage, the light power of the discharge lamps 17 in the illumination station is regulated. The light power of the discharge lamps is greatly dependent on the lamp aging, on the unit scatter and on the temperature. In order to become independent of these tolerances, the light power is acquired, for example, by a photosensor PS arranged in the light channel of the discharge lamp 17 and is leveled by boosting or lowering the lamp current. In order to be able to better regulate the light power, a light source that is uniform over its entire length is employed, the intensity thereof being designationally controllable.

The contrast potential or residual potential of the photoconductive drum 12 has a further significant influence on the print quality when, for example, it is discharged from a regulated charging potential with defined illumination. Despite a regulated charging potential, extremely noticeable deviations in residual potential or, respectively, in discharge capability derive over the spectrum of photoconductor units. These tolerances partly correspond to deviations of a type as can arise given unregulated charging. In addition to being dependent on unit scatters of the photoconductive drums, the overall tolerances of the residual or, respectively, contrast potential are also dependent on power fluctuations of the writing light and, under certain circumstances, are also dependent on influences by the toner (developer mix). A constant quality of the printer result is thus not always guaranteed, particularly given solid areas or, respectively, when printing bar codes.

Too high a residual potential leads to inadequate large-area inking.

Regulating the residual potential, however, is difficult. Further, a leveling is not possible without risk to, for example, the print quality. The residual potential, however, can be acquired with the assistance of a monitoring means.

This monitoring means thereby uses two sensors, namely, the charge sensor SL that is also used for measuring the charging potential and the toner mark sensor TA.

The charge sensor SL and the toner mark sensor TA are situated in the region of the photoconductor 12 on a single motion track. A test mark that is preferably generated on the photoconductor outside of the actual printing region thus first proceeds into the region of the charge sensor SL and then into the region of the toner mark sensor TA.

A charge sensor SL thereby has a number of functions:

It first serves in the way described for measuring the charging potential, whereby it covers the non-illuminated regions after the charging.

Figure 8:
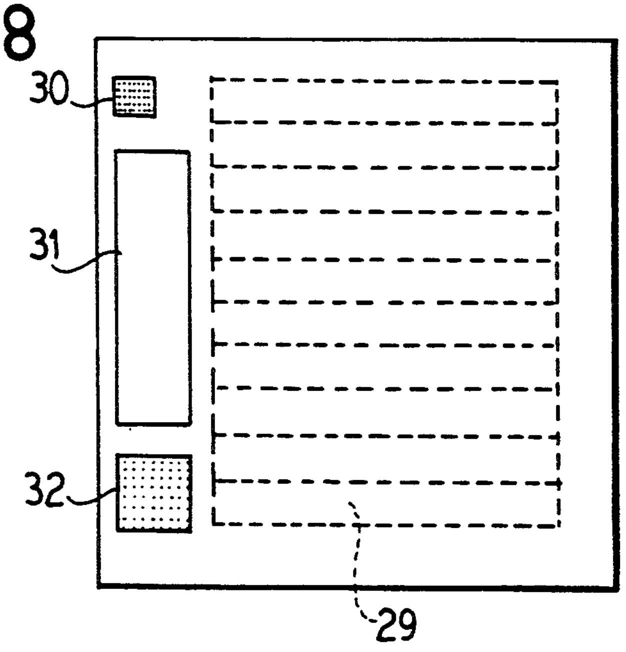
FIG. 8 a schematic illustration of the test marks and test patterns produced on the photoconductor.

It also serves the purpose of measuring the residual charge of the residual charge potential. This occurs in that, corresponding to the illustration of FIG. 8, an elongated solid-area mark 31 is generated at the edge of the photoconductive drum by illumination outside of the printing region 29. All LEDs at the character generator needed for generating the solid-area mark are thereby activated with a prescribed light power, whereby this light power is dependent on the nature and temperature of the photoconductor. When the solid-area mark 31 has been produced by illumination but has not yet been inked, the charge sensor SL measures the residual potential in the region of the solid area. Among other reasons, the elongated solid area mark is necessary because the charge sensor SL has a certain intrinsic inertia and a reliable measurement is only possible after a defined time and, thus, after a defined passage of the solid area mark as a consequence of the circumferential speed of the photoconductive drum.

Following the developer station, the optical sensor TA in the form of a reflection light barrier is situated in the same motion track of the photoconductor 12. The reflection light barrier is constructed in a standard way and is composed of a light source and of a phototransistor as receiver. The output signal of the phototransistor is dependent on the reflectivity of the toner mark applied on the photoconductor that has now been inked via the developer station and, thus, is dependent on the color saturation, i.e. on the optical density of the mark (pattern) that has been applied and inked by the developer station. The wavelength of the reflection light barrier is selected such that the scan light has no influence on the function of the photoconductor drum. This is necessary because the light barrier is constantly activated and, thus, also scans the regions that were not illuminated.

For acquiring the residual potential, test routines for generating the described solid-area marks are called in from time to time via test programs stored in the drive arrangement. The residual potential in the illuminated and non-inked solid-area mark is then calculated via the charge sensor SL and this signal is compared to a limit value stored in the memory means and, dependent on this comparison process, a warning signal is triggered at the display means AZ when the residual potential is exceeded. By changing the bias at the developer station (bias voltage) or on the basis of other measures, the maintenance personnel can then stabilize the residual potential. This leveling, however, can also be automatically be assumed by the regulating arrangement.

However, it is also possible to influence the residual potential by varying the light intensity of the character generator 13 and thus leveling the residual potential. To this end, the intensity of the writing light of the character generator 13 is varied dependent on the comparison event. This ensues by varying the drive current or, respectively, the drive voltage of the LED.

When a character generator having a laser beam is employed instead of a character generator having activatable, discrete points (LED comb), then it is necessary to vary the intensity of the laser beam; this, for example, can also ensue via filters or other measures.

The development means is regulated with a second regulating unit CC2 in order to assure and optimize the development of the charge image.

For regulating the toner conveying from the reservoir TV via the metering means D to the developer station 14, a toner mark 30 is constantly produced at short time intervals on the photoconductor 12 outside of the actual printing region, being produced via the character generator 13 and with a defined exposure intensity, and this toner mark 30 is inked via the developer station. The inked toner mark 30 is then sensed on the photoconductor 12 with the assistance of the optical sensor means TA and the regulation of the conveying of the toner from the reservoir TV via the metering means D to the developer station 14 then ensues dependent on the inking degree of this mark. A depletion of the developer supply in the developer station 14 is directly reflected in the color density of the toner marking. When the developer supply in the developer station is used, the color density of the toner marking is changed greatly; this can no longer be compensated by additional conveying. This used condition is recognized by the regulating arrangement and a warning signal is activated at the display means AZ.

At further, greater time intervals, a test pattern can be generated by calling in a test routine "large-area inking" via, for example, the control panel and this, for example, can be composed of a bar that extends over the entire width of the recording medium. This test pattern can likewise be sensed on the photoconductor via the optical sensor means TA; to that end, for example, the plurality of sensors can also be arranged side-by-side. This, however, can also be accomplished via a single sensor when, for example, an elongated bar corresponding to the solid-area mark 31 is employed as test pattern, this being arranged outside of the actual printing zone and a continuous sensing ensuing upon passage of the test mark. This sensing, however, can also ensue section-by-section at short intervals. A value for the large-area inking can be derived therefrom. When the degree of inking of the test pattern is too low, then the inking of the background regions on the photoconductor drum and/or on the paper is to be checked first. When this is too high, then this indicates an apparatus malfunction or very old developer mix. Appropriate activities in order to compensate this can then be undertaken.

In the case of a correct inking degree of the background region, an improvement of the large-area inking can be achieved by correcting the bias of the developer drum or by correcting the operating point of the toner conveying control.

The background region of print images can likewise be monitored via the sensor means TA. This background monitoring can thereby constantly ensue. When the background inking exceeds an allowable degree, then the degree of inking of the large area is again checked first. When this is within the allowable limits, then it can be corrected as described in the measurement of the large-area inking.

A further possibility of monitoring the print quality is comprised in the acquisition of the screen reproduction.

A defined screen reproduction can be deteriorated due to different discharge characteristics of the photosensitive recording material in the fine area. For example, an extremely well-dischargeable photoconductive layer modifies a screen to higher or, respectively, darker values, whereas a somewhat more poorly dischargeable photoconductive layer obstructs the screen printing. Since the human eye is extremely sensitive on this point and high demands must therefore be raised in this respect, it is necessary to correct this tolerance.

The imaging presentation with electrophotographic printers ensues in the point pattern in various gray tones, whereby the presentation of gray tones ensues on the basis of corresponding configuration of discrete points that are of the same size.

In order to be able to check this gray tone presentation, it is possible to generate a screen mark at certain time intervals by calling in a test routine via the regulating arrangement. According to the illustration of FIG. 8, the screen mark is composed of a screen area that has a 50% optical density (black area), i.e. 50% black, 50% white. This, however, can vary in a range from 25-75% area coverage. The screen mark is generated via the character generator 13 and is inked via the developer station 14. It is then sensed in the described way via the optical sensor TA.

The sensed value is compared to a stored, rated value and the light intensity of the character generator 13 is varied corresponding to the deviation, for example by boosting or lowering the LED voltage. The stored, rated value, however, can itself also be varied dependent on various machine parameters in order, for example, to thus achieve an adaptation dependent on the material employed for the recording medium, on the photoconductive drum employed or on the type of recording medium itself. To this end, the corresponding correction values or characteristic data can be input via the display means AZ or, on the other hand, appropriate sensors independently acquire these values.

The transfer printing station is fundamentally regulated with a third regulating unit CC3 for assuring and optimizing the transfer printing. It has proven that the setting on an optimum transfer printing corotron current in the corona means UK of the transfer printing station 15 is highly dependent on the weight of the paper employed as well as on the paper width and is also dependent on the corotron contamination itself. In order to be able to optimally set the transfer printing corona means, the paper width and the paper thickness are input via the control pattern AZ with its input means fashioned like a keyboard and the allocated, optimum transfer printing corotron current previously calculated from emperical values is set via the apparatus software. This can also be automatically accomplished with an acquisition means not shown here that, for example, acquire the thickness and size of the paper via an opto-electronic sensing means when the single sheets depart via the delivery channels 11.

All parameters important for the print quality are acquired and stabilized by the three regulating units. It is thereby possible to place the operating points of the various parameters into optimum regions without taking the worst-case conditions into consideration and is thus possible to always reliably guarantee the maximally obtainable quality.

Further, the data acquired and calculated during the course of the regulating process can be used for testing and servicing purposes.

Figure 5:
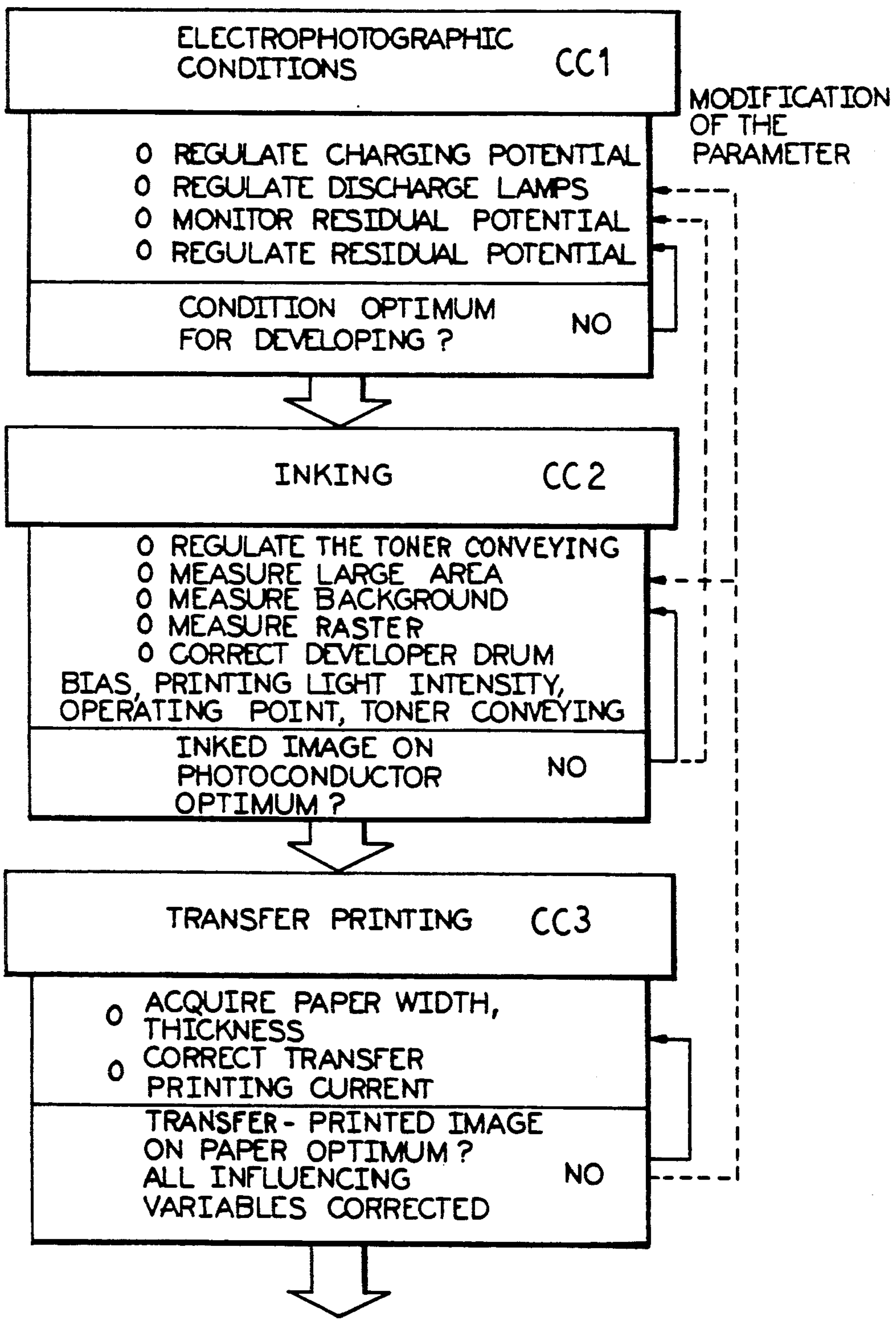
FIG. 5 a schematic illustration of the structure of the control arrangement for program-assisted electrophotography.
Figure 6:
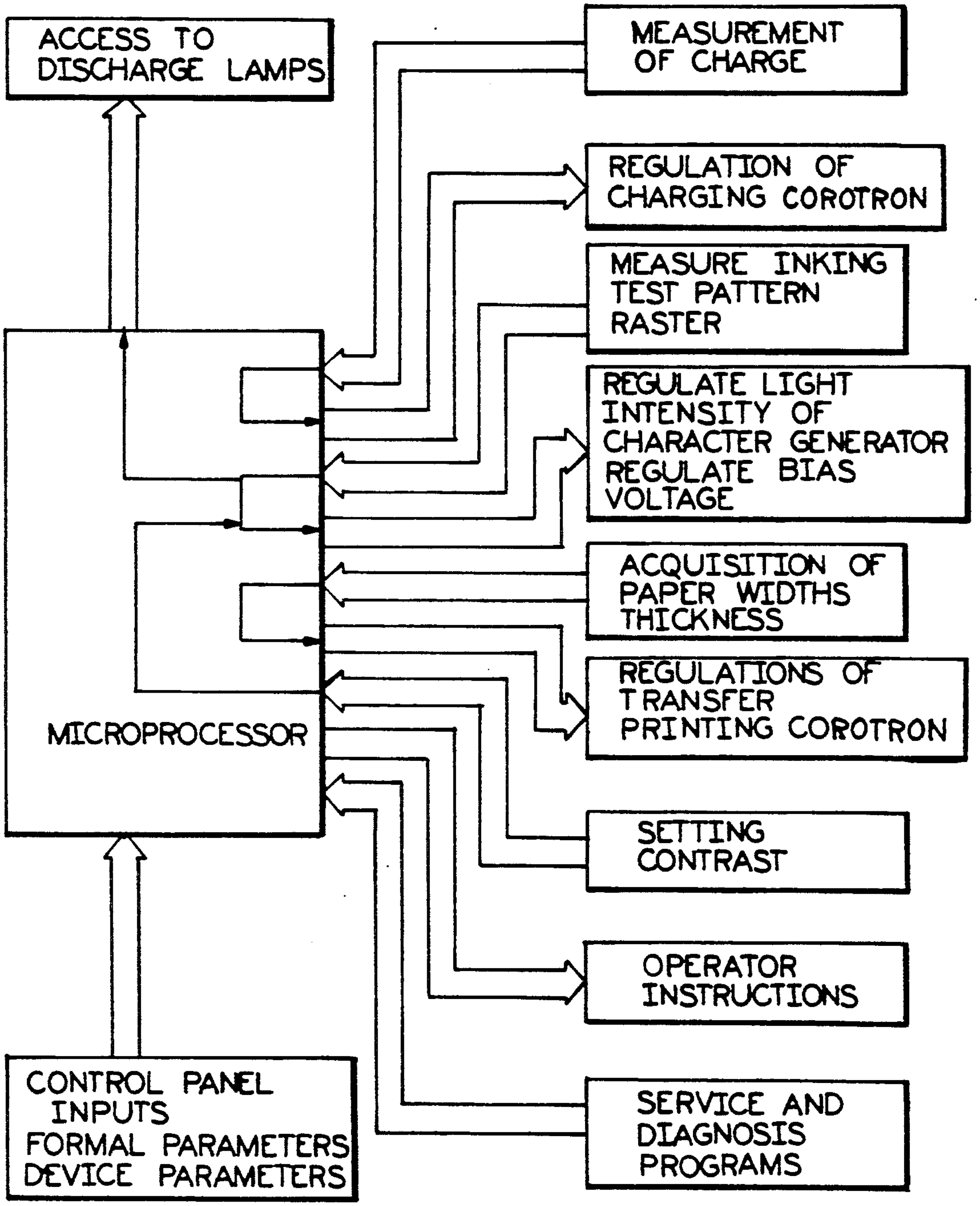
FIG. 6 a schematic illustration of an overall view of the regulation concept.
Figure 7:
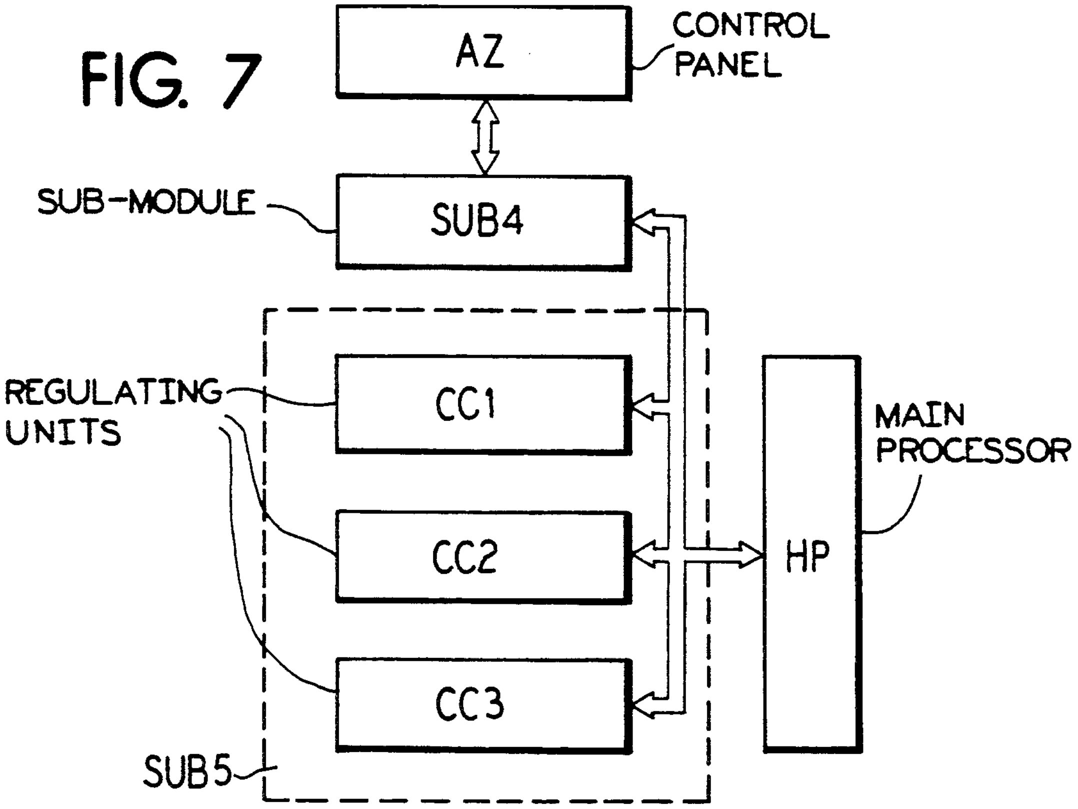
FIG. 7 a schematic block circuit diagram of the control arrangement for program-assisted electrophotography.

The structure of this regulation process referred to as program-assisted electrophotography is listed in FIG. 5. An overall view of the regulating concept can be taken from FIG. 6. The control circuits shown in FIG. 6 are largely self-contained in order to make a surveyable and undefined control behavior impossible. The influencing of the individual control circuits ensues dependent on the results of the individual process steps, for example of the change of a parameter.

In summary, the critical functions of the microprocessor-assisted regulating arrangement are as follows:

Regulating the charging potential of the photoconductive drum.

In addition to a noticeable reduction in tolerances, the information as to whether the conditions in the electrophotographic printing process are still regular are present for diagnostic purposes via the setting value of the charging corotron current calculated in the microprocessor.

Thus, a great diminution or increase in the charging capability of the photoconductive drum caused by external influences such as temperature, toner, etc., can be recognized, evaluated and leveled.

Further, various test programs can sequence routinely or upon command for diagnostic and remote diagnostic purposes, gray veil test, background test.

Acquisition of the residual potential (discharge potential) or, respectively, regulation of the residual potential via, for example, the light power of the character generator.

The information about the residual potential of the photoconductive drum supplies valuable indication about the current condition of the electrophotographic printer. The residual potential can be regulated within limits via the light power of the character generator.

For example, the value of the residual potential can thus provide information as to whether it is possible to print demanding programs (bar code) or screen printing with high quality. A regulation of the light power character generator is likewise possible by sensing the screen marks. When, for example, the screen mark is too dark, the light power is reduced and the mark becomes lighter.

Further, deterioration of the discharge capability caused, for example, by toner can be recognized and monitored.

Regulating the inking capability

In view of the relatively great fluctuations of the inking of large areas, the information about the degree of inking can be used to adapt various parameters such as, for example, the bias of the developer station within certain limits.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

We claim:

1. Electrophotographic printer means wherein charge images are generated on a photoconductor in the framework of an electrophotographic process in a sequence of process steps that sequence successively or, respectively, overlap one another, said charge images being generated via a character generator, being developed in a developer station, and being transferred onto a recording medium in a transfer printing station, comprising:

- a process-controlled, regulating arrangement for optimizing the various operating parameters of the electrophotographic process by stabilizing an individual process step with respect to their operating parameters, whereby the next process step is based on a sequencing, stabilized process step;
- regulating blocks allocated to the individual process steps and arranged following one another for automatic regulation of the individual process steps based on the operating parameters of the individual process step and of the preceding process steps;
- sensors for acquiring the operating parameters of the individual process steps and input means for specific characterizing quantities of the electrophotographic process; and
- means for generating test marks and/or test patterns of process-relevant structures on the photoconductor outside of an actual printing region via the character generator dependent on the operating condition of the printer means, the charge status of said test marks and/or test patterns of process-relevant structures after the exposure and their inking density after the development on the photoconductor being acquired via the sensors.

2. Electrophotographic printer means according to claim 1, wherein the printer means further comprises a first regulating block for stabilizing the electrophotographic process on the photoconductor by regulating and/or monitoring the operating parameters of the photoconductor such as charging potential, discharge illumination and residual potential; a second regulating block for assuring and optimizing the development of the charge image by regulating and/or monitoring the operating parameters of the developer station such as toner delivery to the development region, inking of the charge image, cleaning of the photoconductor and light intensity of the character generator; and a third regulating block for assuring and optimizing the transfer printing by regulating and/or monitoring the operating parameters of the transfer printing station via an acquisition of the specific recording medium characteristics and adaptation of the corona means.

3. Electrophotographic printer means according to claim 1, wherein one of the sensors is a charge sensor arranged between character generator and developer station and another of the sensors is an optical sensor following the developer station in the moving direction of the photoconductor, whereby charge sensor and optical sensor are arranged following one another in a motion track of the photoconductor.

4. Electrophotographic printer means according to claim 3, wherein the optical sensor is fashioned as a reflection light barrier whose scan light has such a wavelength that the scan light does not photoelectrically influence the photoconductor.

5. Electrophotographic printer means according to claim 1, wherein a toner test mark is generated at regular, chronological intervals, the inking density of said toner test mark being sensed by an optical sensor of the sensors and being communicated to the regulating arrangement that, dependent on the inking density regulates the toner delivery to a developing region and/or actuates an alarm means.

6. Electrophotographic printer means according to claim 1, wherein, after call-in of a test routine via the regulating arrangement, a solid-area test mark is first generated by illumination with an illumination intensity that, on the one hand, makes it possible to identify the residual charge potential via a charge sensor of the sensors and, on the other hand, then enables a sensing of the inking density via an optical sensor of the sensors after an inking of the solid-area mark as needed.

7. Electrophotographic printer means according to claim 1, wherein, after call-in of the test routine via the regulating arrangement, screen marks having a defined optical density are generated and are sensed by an optical sensor of the sensors; and wherein the regulating arrangement sets, preferably, the light power of the character generator dependent on the output signal of the optical sensor, setting this in addition to other control parameters.

8. Electrophotographic printer means according to claim 1, wherein the character generator is a character generator whose light intensity is controllable.

* * * * *